United States Patent [19]
Lilienthal, II et al.

[11] Patent Number: 5,429,697
[45] Date of Patent: Jul. 4, 1995

[54] METHOD OF SEALING A MODULE

[75] Inventors: Peter F. Lilienthal, II, Princeton, N.J.; Ivan Pawlenko, Holland, Pa.

[73] Assignee: AT&T Corp., Murray Hill, N.J.

[21] Appl. No.: 143,724

[22] Filed: Nov. 1, 1993

[51] Int. Cl.⁶ .................. H02G 15/04; B29C 63/26
[52] U.S. Cl. ................. 156/244.19; 156/244.13; 156/145; 29/866; 439/426; 439/936
[58] Field of Search .............. 156/244.13, 244.18, 156/244.19, 145; 29/866; 439/426, 936, 519

[56] References Cited

U.S. PATENT DOCUMENTS

| | | | |
|---|---|---|---|
| 3,571,779 | 3/1971 | Collier | 439/426 X |
| 3,596,231 | 7/1971 | Melton | 439/426 |
| 4,192,569 | 3/1980 | Mucci | 439/426 X |
| 5,069,637 | 12/1991 | Baubles | 439/412 |
| 5,149,281 | 9/1992 | Hills et al. | 439/936 X |
| 5,246,383 | 9/1993 | Shimirak et al. | 439/936 X |

*Primary Examiner*—Michael W. Ball
*Assistant Examiner*—Francis J. Lorin
*Attorney, Agent, or Firm*—Robert B. Levy

[57] ABSTRACT

A method is provided for sealing openings (24, 26) in a module (10). In accordance with the method, each opening is sealed by providing a readily-puncturable sealing membrane (30, 30') within the module itself to overlie each opening. Each membrane advantageously prevents a gel (28), admitted into the module, from leaking out.

2 Claims, 2 Drawing Sheets

METHOD OF SEALING A MODULE

TECHNICAL FIELD

This invention relates to a module having at least one opening therein sealed by way of a readily-puncturable seal.

BACKGROUND OF THE INVENTION

A terminal block, of the type found in telephone systems, generally includes a hollow, prismatically-shaped insulative module having an open bottom. The module is designed to overlay at least a pair of insulation displacement terminals (i.e., contacts) extending out from a mounting board into the open bottom of the module. The module has at least one opening therethrough to allow each of a pair of wires to be received in the module for connection to a separate one of the insulation displacement terminals. A spacer is situated within the module to guide each wire to its corresponding insulation displacement terminal and to hold each wire tight against the terminal for electrical contact therewith when the module is secured against the mounting board.

As described in co-pending U.S. patent application Serial No. 08/102,178, filed Aug. 4, 1993, in the names of P. F. Lilienthal et at., and assigned to AT&T (herein incorporated by reference), an advantage is obtained by filling the module with a silicone resin gel. The gel serves to encapsulate the insulation displacement terminals when the module is placed thereover, while permitting each wire to make an electrical connection with its corresponding terminal. Advantageously, the gel isolates the insulation displacement terminals from external elements (i.e., moisture) and from environmental erosion.

At the present time, modules of the type described above are fabricated by first molding the module from an insulative material such as polycarbonate or the like. Thereafter, the module is oriented upside down with its open bottom now facing up so that the module can be filled with gel. To prevent the gel from leaking out through the opening(s) in the module prior to curing, the openings must be sealed. In the past, each opening was sealed by way of a rubber seal held against the module via a spring clamp. After the gel was admitted into the module and then cured, the spring clamp and seal were removed to allow access to the opening. The process of clamping and unclamping the rubber seals has been found to be awkward and time consuming.

In U.S. patent application Ser. No. 08/135,645, tilted on Oct. 14, 1993, in the names of P. F. Lilienthal et al., and assigned to AT&T (herein incorporated by reference), a fixture is described for simultaneously sealing and fixturing a module of the type described above to facilitate filling the module with gel. The fixture disclosed in the Lilienthal et al. '645 application. comprises an elongated, generally U-shaped channel having a pair of spaced-apart, resilient walls, each integral with, and rising upward from, a separate one of the ends of a base member. Each of a plurality of resilient seal members protrudes outward from a separate one of the walls and base member for receipt in a separate one of the module openings to seal the openings when the module is seated within the channel so as to be held between the channel walls. While the fixture disclosed in the Lilienthal et al. '645 application eliminates much of the awkwardness incurred with the prior art spring clamps, the need to place modules in, and remove such modules from, the fixture does not represent an optimal solution to the problem of sealing the module openings.

Thus, there is a need for a technique for sealing each opening in a module in an efficient manner.

SUMMARY OF THE INVENTION

Briefly, in accordance with a preferred embodiment of the invention, a method is provided for fabricating a module. The method includes the step of providing an insulative, hollow body having an open top and at least one opening through the body below the top. A sealing membrane is provided within the body across each opening to seal the same. The sealing membrane may take the form of a piece of adhesive-backed tape or a thin layer of material integral with the body and spanning the opening. With each opening sealed, the body can be filled with a silicone gel. Once the body is filled with the gel, the gel is cured, typically, although not necessarily, by heating. Following gel curing, each sealing membrane is punctured to allow access into the body through the opening previously sealed by that membrane.

The above-described fabrication method advantageously accomplishes sealing of the openings in the module body without the need for any external fixture or clamps.

DETAILED DESCRIPTION

Figure 1:
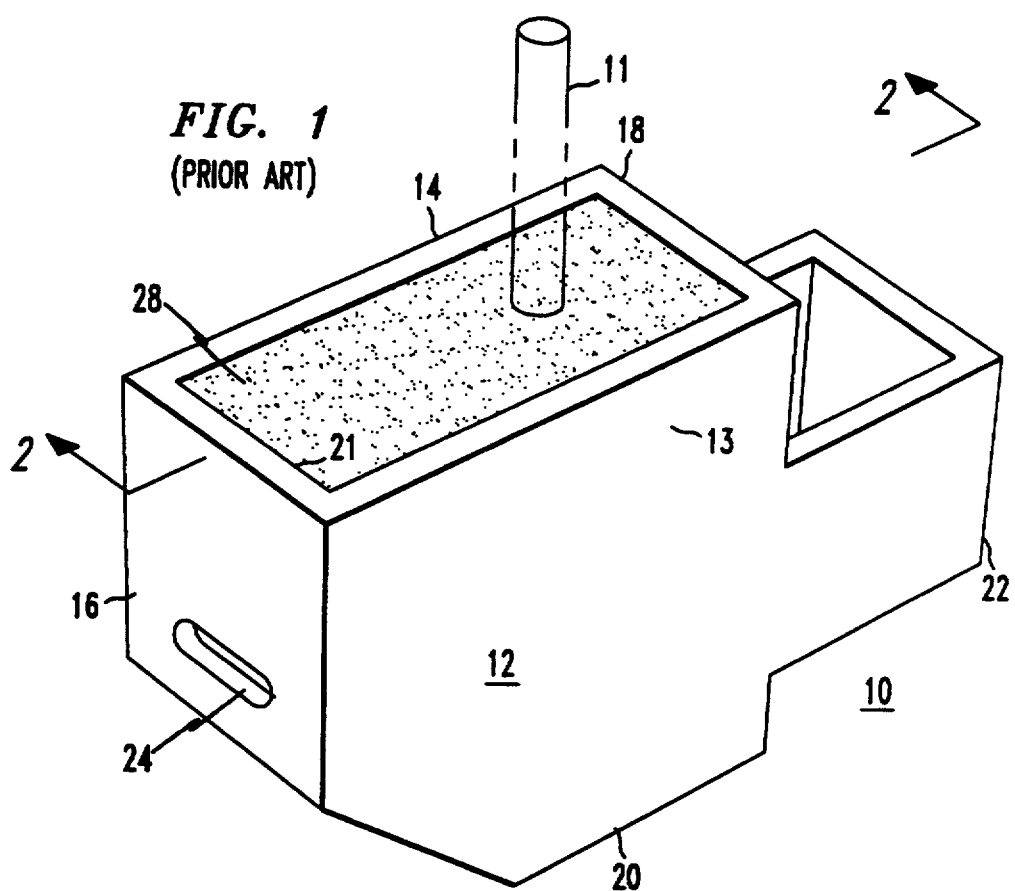
FIG. 1 is a front view, in perspective, of a module in accordance with the prior art.

FIG. 1 shows a prior-art module 10 for enveloping at least one, and preferably, a plurality of insulation displacement terminals 11 (only one shown in phantom). For ease of discussion, the module 10 and each terminal 11 have been shown inverted from their usual orientation. Normally, the module 10 overlays each terminal 11, with each terminal extending upwardly into the bottom of the module.

The module 10 generally comprises a hollow, prismatically-shaped main body 12 formed of a rigid, insulative material such as polycarbonate or the like. The main body 12 has two pairs of opposed walls 13 and 14, and 16 and 18, respectively, and a base 20 integral with each of the walls. The main body 12 has an open top 21 sized to receive each insulation displacement terminal 11. A spacer (not shown) is typically placed within the main body 12 through the open top 21 for imparting a greater degree of rigidity to each terminal 11.

In the illustrated embodiment, the main body 12 of the module 10 has a prismatically-shaped projection 22 integral with, and protruding rearward therefrom (as seen in FIG. 1 ). The projection 22 is hollow and has an open top to receive a fastener (not shown) that extends through the projection to secure the module 10 to a mounting board (not shown).

Figure 2:
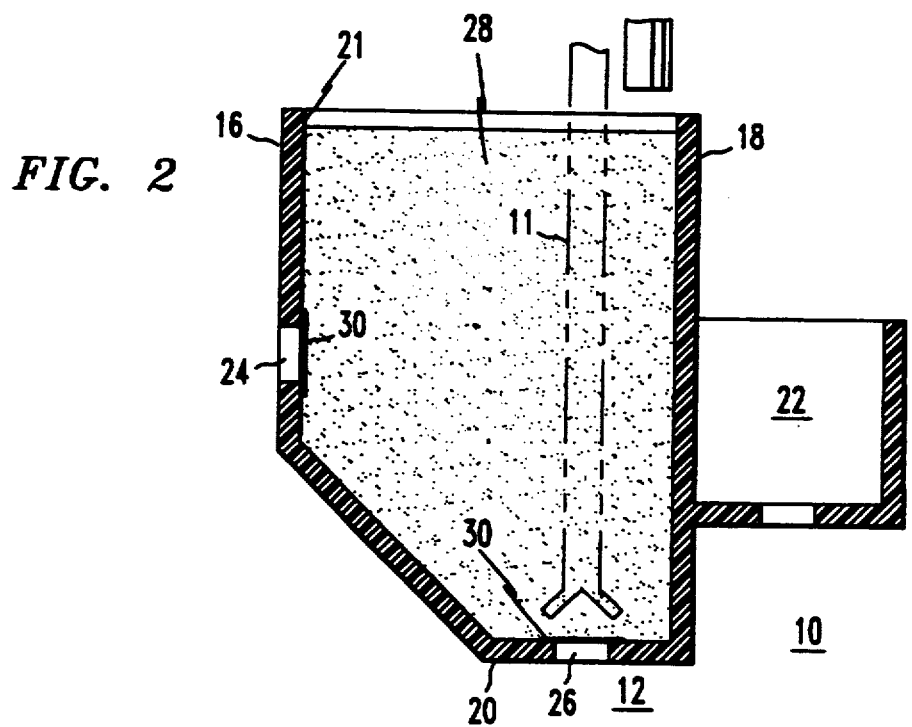
FIG. 2 is a cross-sectional view of the module elf FIG. 1 taken along the plane 2—2, showing a seal, in accordance with a first aspect of the invention, sealing a separate opening in the module.

The main body 12 of the module 10 has an opening 24 through its wall 16. As best illustrated in FIG. 2, the main body 12 also has an opening 26 disposed through the base 20. Each of the openings 24 and 26 is located bellow the open top 21 of the main body 12 to enable a separate pair of wires (not shown) to be inserted into the main body to make an electrical contact with one or more of the insulation displacement terminals 11. It should be understood that the module 10 may have a smaller or larger number of openings located in the same or a different one of the walls 13, 14, 16 and 18 and/or base 20.

Referring both to FIGS. 1 and 2, it is advantageous to fill the main body 12 of the module 10 with a silicone gel 28 to encapsulate each insulation displacement terminal 11 within the module. As discussed at the outset, the gel 28 protects the terminals 11 against moisture and environmental corrosion. In order to fill the main body 12 of the module 10 with the gel 28 through the open top 21, the openings 24 and 26 must be sealed since each opening is below the open top and thus would leak gel during filling. In the past, the openings 24 and 26 were sealed by way of a seal (not shown) held against the exterior of the main module body 12 by a clamp or fixture (not shown).

In accordance with the, invention, the openings 24 arid 26 of FIG. 2 are each advantageously sealed via a separate sealing membrane 30 situated in the module main body. In a first embodiment of the invention illustrated in FIG. 2, each sealing membrane 30 takes the form of a piece of adhesive-backed tape having its adhesive-covered side adhered to the inside surface of the module main body 12 to overlay a separate one of the openings 24 and 26. Sealing each of the openings 24 and 26 with a separate one of the tape-type sealing membranes 30—30 affords several distinct advantages. First, no clamps or external fixtures are required to seal the openings 24 and 26. Secondly, since each tape-type membrane 30 has its adhesive-covered side adhered to the inside surface of the main module body 12, contamination of the gel 28 by the membrane is avoided. Further, by adhering each tape-type membrane 30 to the inside surface of the module main body 12, the gel 28 is less likely to ooze out through each of the openings 24 and 26 once the gel 28 is cured and a wire is inserted through each opening following puncture of the membrane. Also, the membrane 30 serves to keep the gel 28 from being contaminated by dust etc.

Figure 4:
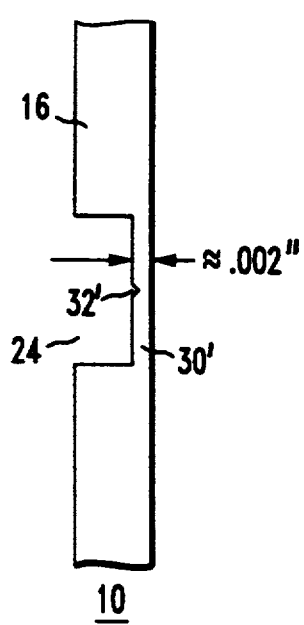
FIG. 4 shows a partial cross section of the module of FIG. 2 wherein an opening through the module is sealed in accordance with a second aspect of the invention.

Referring to FIG. 4, one approach to adhering the tape-type sealing membrane 30 to the opening 24 is to engage the non-adhesive side of the tape-type membrane by a flange 31 depending from one end of a rotatable arm 32. Typically, the tape-type sealing membrane 30 has its non-adhesive side engaged by the flange 31 by a vacuum drawn through a vacuum port 34 that runs through the arm 32 so as to communicate with an aperture in the flange. Once the tape-type, membrane 30 is engaged by the flange 31 on the arm 32, the arm is then rotated to place the adhesive-covered side of the tape-type membrane against the inside (i.e., the right-hand) face of the wall 16 to overlay the opening 24. After the tape-type membrane 30 is adhered to the inside of the wall 16, then a vacuum is no longer drawn through the vacuum port 34 in the arm 32. A similar type of arm could be used to place the tape piece 30 over the opening 26 in the base member 20 of FIG. 2.

Referring to FIG. 2, with each of the tape-type membranes 30 placed over a separate one of the openings 24 and 26, then the module main body 12 can be filled with the gel 28 without the risk that the gel will leak from each opening. After being admitted into the main module body 12, the gel 28 is cured, typically by heating the module 10 in an oven (not shown). The gel 28 could be cured by other means as well. The gel 28, once cured, exhibits a very high viscosity, so high that when each sealing membrane 30 is punctured, the gel remains in the module. As seen in FIG. 4, each tape-type membrane 30 can be punctured, following curing of the gel 28, by means of a tool 36 formed of a solid cylinder having a rounded tip.

Referring to FIG. 4, the opening 24 in the module main body wall 16 may also be advantageously sealed by way of a sealing membrane 30' formed of a thin layer of material spanning the opening. In practice, the thin layer-type membrane 30' is formed over the opening 24 during molding the module 10 by "flashing" a portion of the molding material (i.e., polycarbonate or the like) over the opening so that the membrane is integral with the wall 16 of the module main body 12. Typically, the thickness of each of the walls 13, 14, 16 and 18 and the base member 20 of the module main body 12 is on the order of 3/32", whereas the thickness of each thin layer-type membrane 30' is typically on the order of 0.002". Although not shown in FIG. 4, a membrane similar to the membrane 30' would likewise be formed over the opening 28 of FIG. 2 so as to be integral with the base member 20.

Figure 3:
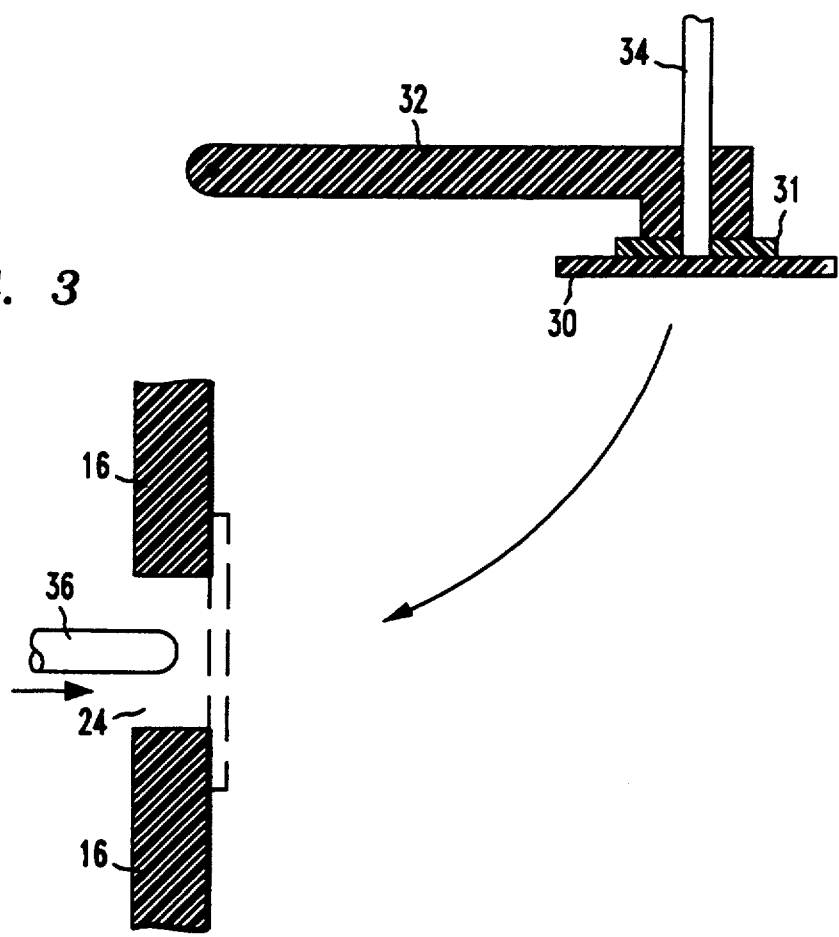
FIG. 3 shows a portion of the module of FIG. 2 together with a mechanism for applying the seal against the module opening.

Like each tape-type membrane 30 of FIGS. 2 and 3, each thin layer-type sealing membrane 30' of FIG. 4 is punctured after the gel 28 of FIGS. 1 and 2 is admitted in the main body 12 and cured. To facilitate puncturing of each thin layer-type sealing membrane 30' the membrane may be scored along one or more score lines 32'—32' best illustrated in FIG. 5. The number and pattern of score lines 32'—32' will depend on the size and geometry of each of the openings 24 and 26 of FIG. 2. Typically, the score lines 32'—32' of FIG. 5 may be inscribed into the sealing membrane 30' by way of a laser or the like.

Figure 5:
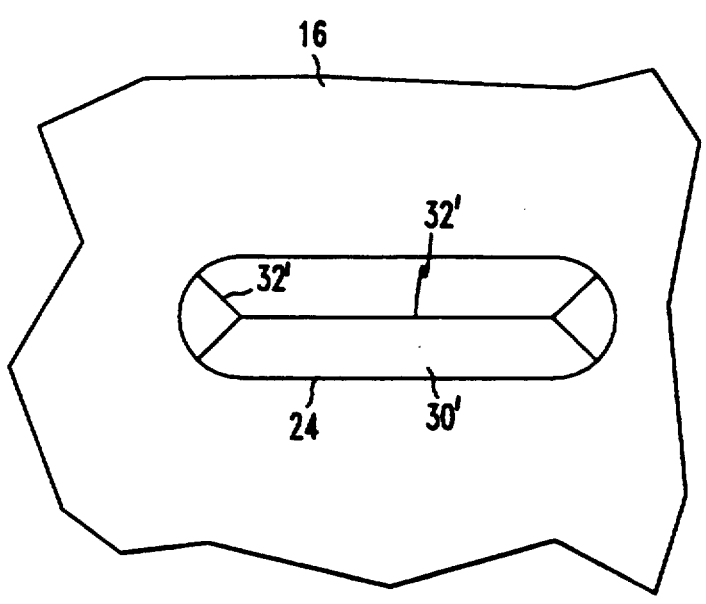
FIG. 5 is partial front view of the module of FIG. 4.

The thin layer-type sealing membrane 30' of FIGS. 4 and 5 affords the same advantages as the tape-type membrane 30 of FIGS. 2 and 3. Moreover, the thin layer-type membrane 30' affords the additional advantage that the membrane is formed at the same time the module 10 is molded, thus avoiding the need for a separate attachment step as required by the tape-type membrane 30.

The foregoing describes a module 10 having at least one, and preferably, a pair of openings 24 and 26, each sealed by way of a readily-puncturable sealing membrane 30 or 30' located on the inside of the module.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method of fabricating a module comprising the steps of:

providing a hollow body having an open top and at least one opening through the body below its open top;
sealing the opening by adhering a piece of adhesive-backed tape across the opening such that the piece of tape is situated inside the body;
filling the body with a silicone gel;
curing the gel; and
puncturing the piece of tape following curing of the gel, to allow access into the body through the opening.

2. The method according to claim 1 wherein each sealing membrane includes the step of inserting a tool through the opening from outside the body to puncture the tape.

* * * * *